United States Patent [19]

Ostby

[11] Patent Number: 4,603,485
[45] Date of Patent: Aug. 5, 1986

[54] LEVELING APPARATUS

[75] Inventor: Lyle D. Ostby, Brookfield, Wis.

[73] Assignee: Kearney & Trecker Corporation, West Allis, Wis.

[21] Appl. No.: 778,788

[22] Filed: Sep. 23, 1985

[51] Int. Cl.[4] ............................................. G01C 5/04
[52] U.S. Cl. ................................................... 33/367
[58] Field of Search ...................... 33/366, 367, 377; 73/432 HA

[56] References Cited

U.S. PATENT DOCUMENTS

| | | | |
|---|---|---|---|
| 2,438,758 | 3/1948 | Leach | 33/367 |
| 2,532,883 | 12/1950 | Bennett et al. | 33/367 |
| 2,804,692 | 9/1957 | Karstens | 33/367 |
| 3,048,927 | 8/1962 | Maloof | 33/367 |
| 3,118,088 | 1/1964 | Hanson | 33/367 |
| 3,269,023 | 8/1966 | Calkins | 33/367 |
| 3,645,135 | 2/1972 | Hadley | 33/367 |
| 3,698,094 | 10/1972 | Stacey et al. | 33/366 |
| 3,842,512 | 10/1974 | Stoltz et al. | 33/366 |
| 3,949,484 | 4/1976 | Cluley et al. | 33/367 |
| 4,001,718 | 1/1977 | Wilson et al. | 324/207 |
| 4,068,189 | 1/1978 | Wilson | 331/117 |
| 4,379,367 | 4/1983 | Legris | 33/367 |
| 4,384,410 | 5/1983 | Melugin et al. | 33/367 |

FOREIGN PATENT DOCUMENTS

| | | | |
|---|---|---|---|
| 2087082 | 5/1982 | United Kingdom | 73/432 HA |
| 1046614 | 10/1983 | U.S.S.R. | 33/367 |
| 1051372 | 10/1983 | U.S.S.R. | 33/367 |

Primary Examiner—Richard R. Stearns
Attorney, Agent, or Firm—James O. Skarsten

[57] ABSTRACT

A device (10) for measuring the difference in elevation between first and second substantially horizontal surfaces (12a, 12b) includes first and second chambers (10a, 10b) respectively located on the surfaces (12a, 12b). The chambers contain quantities of a fluid such as mercury (116) and are coupled together through a conduit (20) which enables mercury (116) to flow between them as required, so that the mercury levels in the chambers will be in the same horizontal plane. A first device (140a) is mounted at a first distance above the fluid in the first chamber and at a fixed distance above the first surface (12a). Likewise, a second device (140b) is mounted at a second distance above the fluid in the second chamber, and at the same fixed distance above the second surface (12b). The first device senses an inductive field varying as the first distance and the second device senses an inductive field varying as the second distance to provide a voltage representing the difference between the first and second distances and thus the difference in elevation between the first and second surfaces.

18 Claims, 10 Drawing Figures

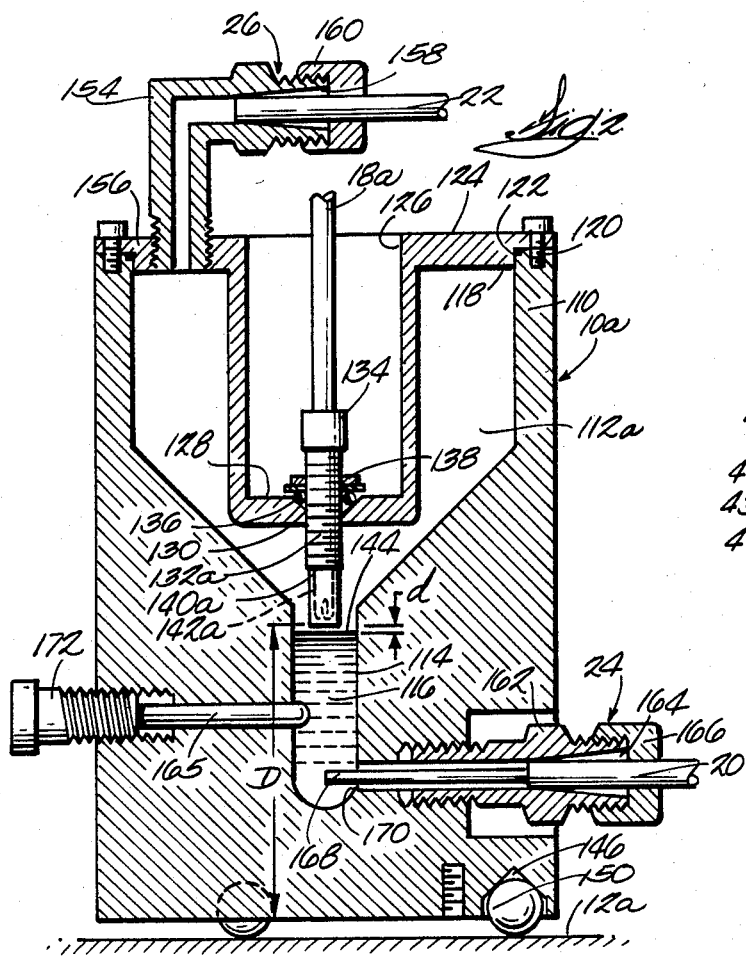
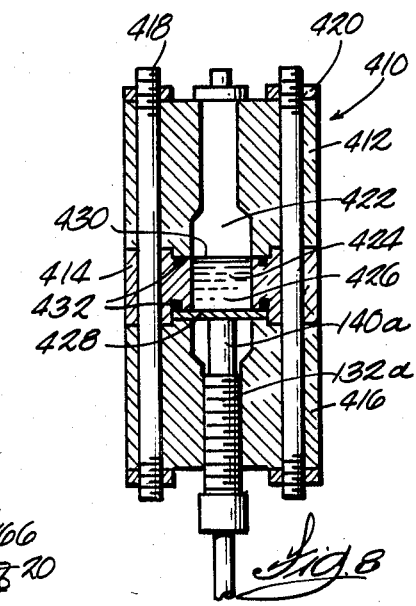
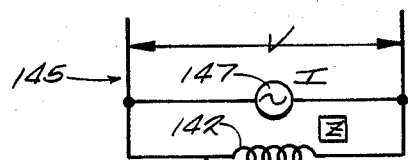
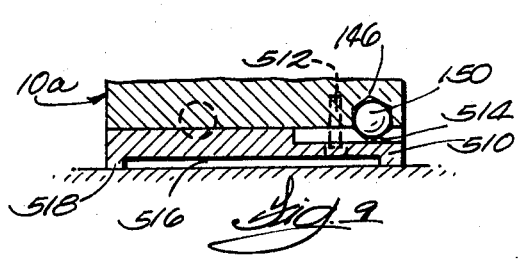
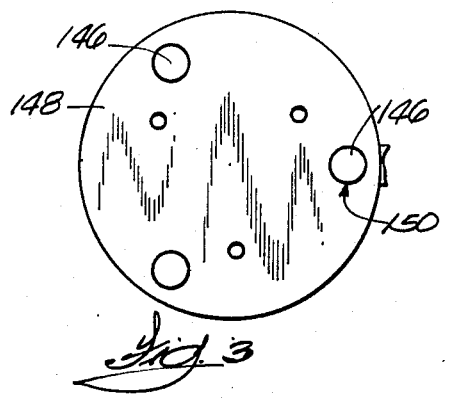
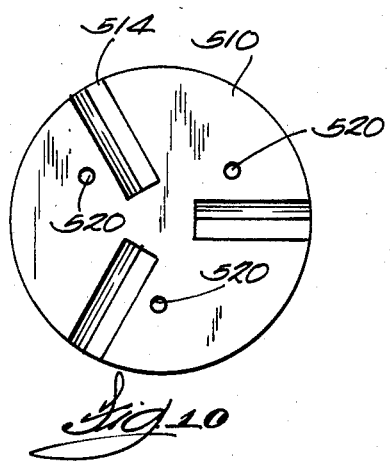

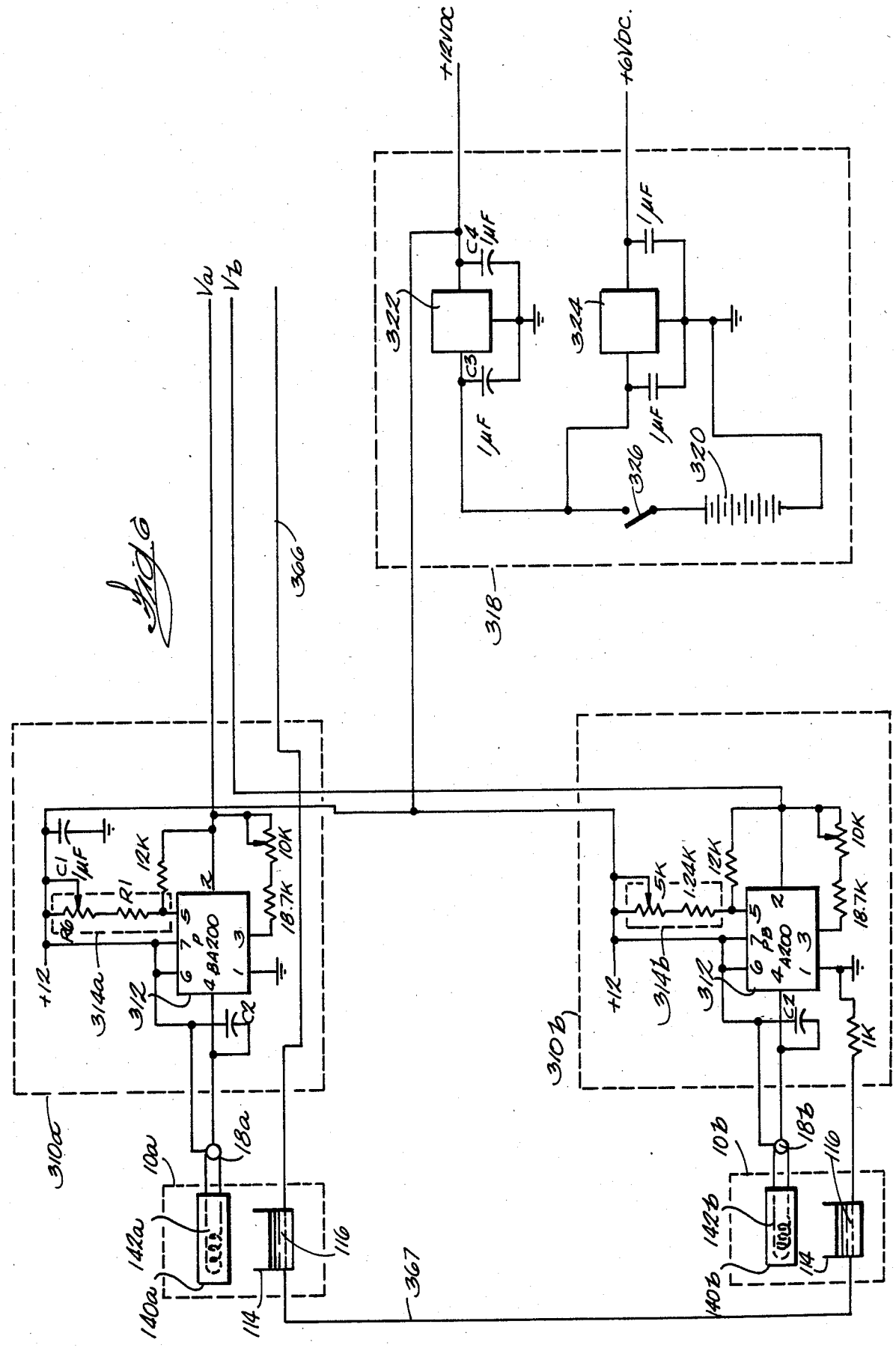

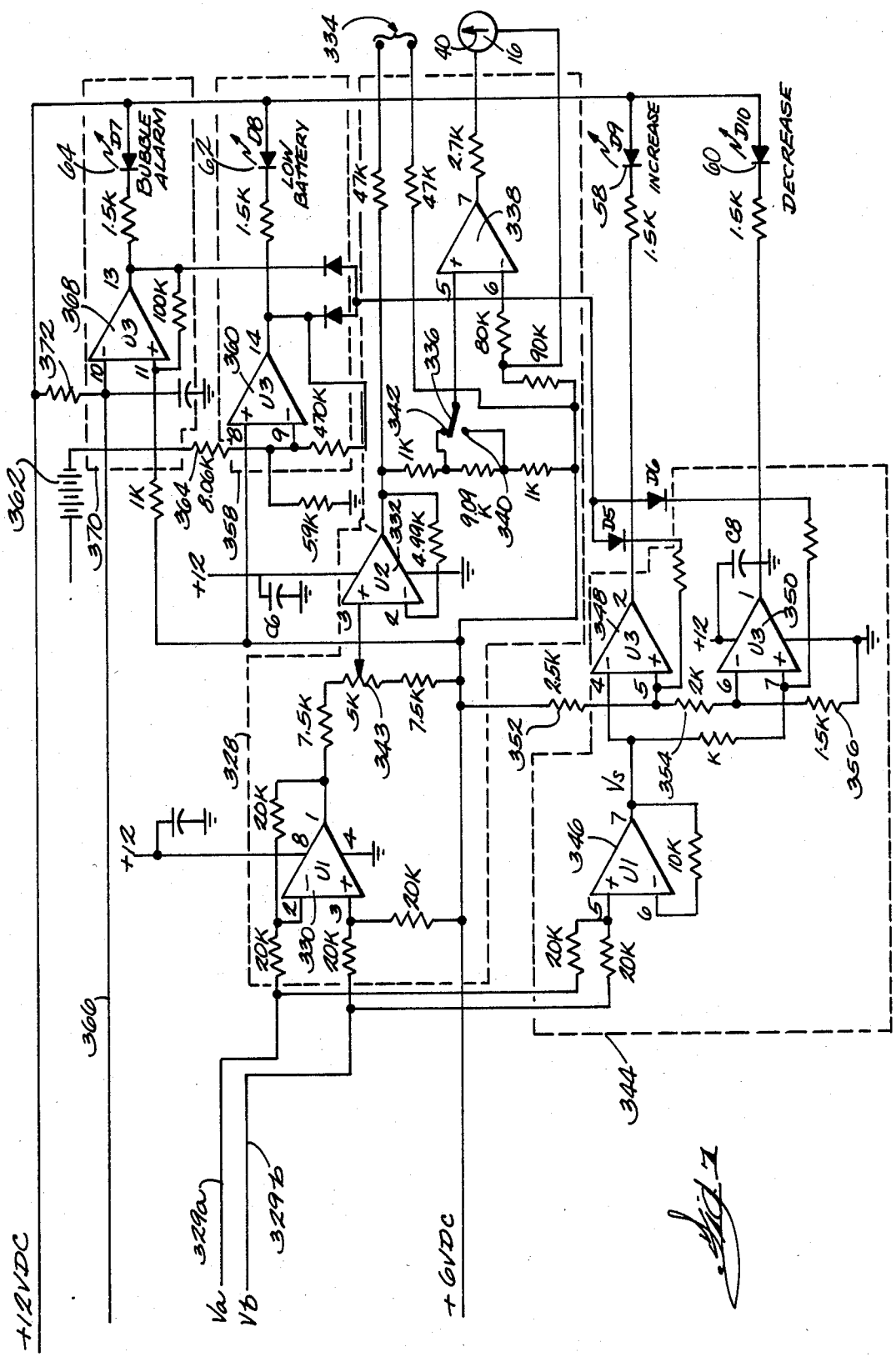

LEVELING APPARATUS

BACKGROUND OF THE INVENTION

The invention pertains to devices for sensing difference in height between two substantially horizontal surfaces.

In order to construct machine tools or set machine tools up for operation, it is frequently necessary to ensure that two horizontal surfaces are at exactly the same level. Examples of such surfaces include the load bearing surfaces of a set of horizontal machine tool ways, and surfaces on machine tool beds. In some instances it is necessary to insure that two separated surfaces are level to within 0.0001 inches.

In the past, such leveling tasks have been performed by devices which include two chambers, a flexible conduit connected between the chambers, and an amount of mercury which partially fills the chambers. The chambers are respectively placed on the surfaces, whereupon mercury flows between the chambers through the conduit in response to gravitational force. The mercury levels in the two chambers thus gives an indication of the height of each of the surfaces. Additional apparatus provides an indication when the heights are the same or, in some cases, shows the value of a height differential.

In one class of such prior art devices exemplified by U.S. Pat. No. 4,379,367, issued Apr. 12, 1983, for an "Electrically Controlled Level," the mercury is mechanically coupled to level indicating structure by means of floats, diaphragms or pistons which directly contact the mercury to alter the resistance or capacitance of an electric circuit. However, the use of mechanically movable parts in a leveling device tends to limit measurement sensitivity and may increase cost and complexity. Also, such device is vulnerable to wear of its moving parts.

In another class of prior art devices exemplified by U.S. Pat. No. 3,645,135, issued Feb. 29, 1972 for a "Mercury System", a capacitor plate is fixed above the mercury in each chamber. The distance between the capacitor plate and the mercury level in each chamber is then determined by measuring the capacitance therebetween. However, such devices tend to require extremely vulnerable electronics, making them very vulnerable, for example, to noise problems.

SUMMARY OF THE INVENTION

The leveling apparatus includes first and second chambers, each partially filled with an electrically conductive fluid such as mercury and connected together by means of a conduit. The chambers are respectively located on the first and second surfaces, whereupon mercury flows between the chambers, as required, to establish the mercury levels in the chambers in the same horizontal plane. When such condition has been established, the mercury level in the first chamber will be at a first distance below a reference level in the first chamber and the mercury level in the second chamber will similarly be at a second distance below a reference level in the second chamber. The reference levels in the first and second chambers are at known fixed distances from the first and second surfaces. The difference in height between the two surfaces will thus be related to the differential between the first and second distances, and will be equal to such differential if the first and second reference levels are at the same fixed distance from their respective surfaces.

To determine the first and second distances, inductive coils are mounted in the chambers, to project electromagnetic fields into the mercury contained therein. Secondary electro-magnetic fields are generated by eddy currents in the mercury and projected upwardly. The strength of the secondary field in each chamber at a given distance above the mercury is a function of such distance, preferably a linear function. Thus, field sensing devices are located in the chambers at the respective reference levels. The sensing device in the first chamber generates a first signal representing field strength at the reference level thereof, and thus represents the first distance. In like manner, the sensing device in the second chamber generates a second signal representing the second distance. The two signals are substracted, to provide a difference signal representing the height or altitude differential between the first and second surfaces.

One advantage of the invention is the high level of precision which it provides in a device for sensing altitude differences between two surfaces.

Another advantage of the invention is the elimination of wearable moving parts in a leveling device.

Another advantage is its adaptability for use in an industrial environment.

Another advantage is the adaptability of the invention to measure altitude difference between surfaces which are spaced widely apart.

Another advantage is the adaptability of the invention for embodiment in a device of comparative simplicity and low cost.

These and other advantages will become more readily apparent from the ensuing Detailed Description of the Preferred Embodiment, taken together with the Drawings.

BRIEF DESCRIPTION OF THE DRAWINGS

FIG. 2 is a sectional elevational view showing a container for the embodiment shown in FIG. 1.

FIG. 3 is a bottom view of one of the containers of the embodiment shown in FIG. 1.

FIG. 4 is a simplified schematic diagram for illustrating the operation of an inductive displacement measuring system.

FIGS. 6 and 7 are schematic diagrams showing electronic circuits for processing signals generated by the embodiment shown in FIG. 1.

FIG. 8 is a sectional elevational view showing a device used to calibrate the embodiment of FIG. 1 for operation.

FIG. 9 is a sectional elevational view showing modified structure for supporting the containers of the embodiment shown in FIG. 1.

FIG. 10 is a top view of the structure shown in FIG. 9.

DETAILED DESCRIPTION OF THE PREFERRED EMBODIMENT

Figure 1:
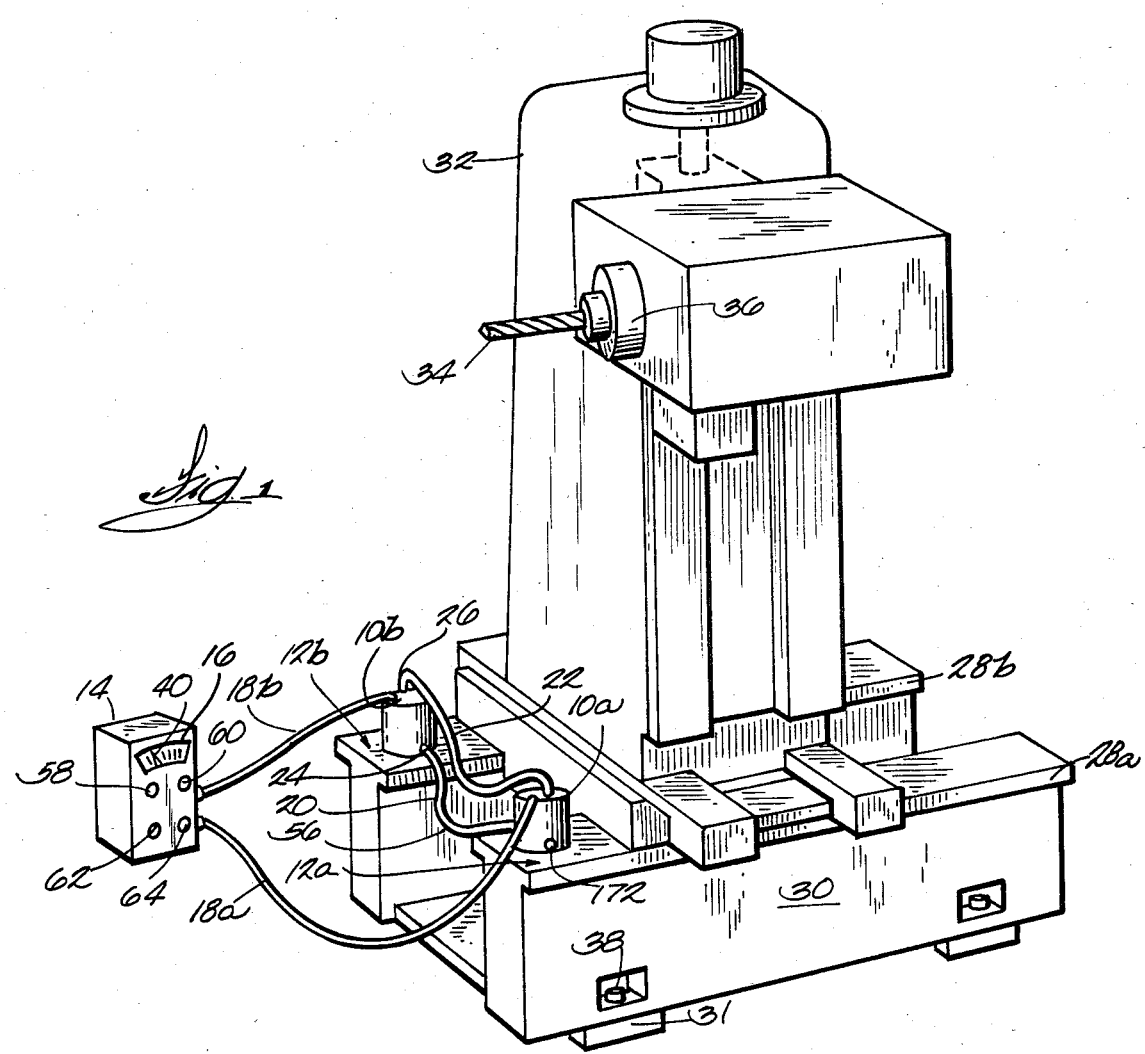
FIG. 1 is a perspective view showing an embodiment of the invention used to determine the difference in altitude between a set of machine tool ways.

Referring to FIG. 1, there is shown apparatus structured according to the invention for determining the vertical spacing, or difference in altitude, between horizontal surfaces 12a and 12b. Apparatus 10 generally comprises cylindrical containers 10a and 10b placed upon surfaces 12a and 12b, respectively, and an electronic module 14 having a readout 16 which shows the altitude differential between surfaces 12a and 12b. Containers 10a and 10b are connected to module 14 through coaxial cables 18a and 18b, respectively, and are coupled to each other through tubes 20 and 22 and fittings 24 and 26. Containers 10a and 10b are hermetically sealed against atmospheric pressure.

In FIG. 1, horizontal surfaces 12a and 12b comprise the load bearing surfaces of ways 28a and 28b, respectively, which are mounted upon a machine tool bed 30. A vertical upright or column 32 is supported for movement along ways 28a and 28b to machine a metal part (not shown). In order to machine parts with a sufficient level of precision, load bearing surfaces 12a and 12b must lie in the same horizontal plane, to within 0.0001 inch. Thus, leveling screws 38 of feet 31 are received through threaded holes formed in base 30, and are turned to selectively raise or lower way 28a and its surface 12a relative to way 28b and its surface 12b. It will be readily apparent that by viewing the position of a pointer 40 of a voltmeter or other readout device 16, leveling screws 38 can be turned to raise or lower way 28a until pointer 40 shows an altitude differential of 0.

While FIG. 1 shows containers 10a and 10b positioned to level bearing surfaces of two different ways, they could alternatively be placed at opposite ends of a single way in order to precisely align the way bearing surface in a horizontal plane.

FIG. 2 shows container 10a provided with a rigid annular wall 110 of varying cross section, which encloses a chamber 112 of fixed volume. The lower portion of chamber 112 comprises a bore 114 of highly uniform cross-section which contains an amount of mercury 116, and the remainder of the chamber is filled with air. The wall of bore 114 is highly polished and teflon coated to prevent resistance to upward and downward movement of mercury 116. A cover 118 is secured to container 10a by means of screws 120 which engage wall 110. When cover 118 is secured in place, an O-ring 122 is compressed between the cover and the chamber wall to seal chamber 112 against passage of air.

Cover 118 is shown in comprise an annular rim 124 and a cylindrical member 126 which is rigidly supported by rim 124 and extends downwardly therefrom in coaxial relationship. The upper end of cylindrical member 126 is open and the lower end thereof is closed by a plate 128. A hole 130 is formed through the center of plate 128 and is provided with threads matching the threads of hollow threaded plug 132a, which is provided with wrench flats 134. Thus, plug 132 may be rotated to enter chamber 112. The joint between plate 128 and plug 132 is tightly sealed by means of an O-ring 136, which is compressed against plate 128 by rotation of a nut 138.

FIG. 2 further shows a probe device 140a extending downwardly from plug 132, probe 140a containing an inductive coil 142a which is spaced a distance d from the surface level 144 of the mercury 116 contained in chamber 112. Coil 142a comprises a component of a device known in the art as an inductive displacement measuring system, capable of precisely determining the distance d, such as to within 0.0001 inch, and generating a voltage signal $V_a$ as a function of d. Coil 142a is oriented to project an electro-magnetic field into mercury 116, and is electrically connected to the remaining components of the displacement measuring system, located in electronic module 14, through coaxial cable 18a extending upwardly through plug 132a. Probe 140a usefully comprises a component of an inductive displacement measuring system manufactured by the Electro Corporation and referred to thereby as an ELECTRO-MIKE DISPLACEMENT TRANSDUCER. However, the scope of the invention is not limited thereto.

FIG. 3 shows three pockets 146 formed in the underside 148 of container 10a which partially receives ball feet 150, usefully formed of sintered aluminum oxide. Ball feet 150 provide a 3-point base which supports container 10a on surface 12a such that surface level 144 of mercury 116 is in parallel relation with surface 12a. The 3-point base prevents container 10a from wobbling or rocking on surface 12a, thus preventing motion of mercury 116 in chamber 112 as the distance d is being measured. Also, use of the 3-point base reduces the chance that any support structure of container 10a will be placed upon debris lying on surface 12a. If a ball foot 150 is initially placed upon a debris particle, the pressure at the point of contact will be such that the ball foot will be likely to crush the particle or push it aside.

Referring once more to FIG. 2, there are shown ball feet 150 supporting container 10a on surface 12a such that coil 142a of probe 140a is fixedly spaced a distance D from surface 12a. Thus, coil 142 of the sensor provides a reference level for measuring mercury surface level 144 as the amount of mercury in chamber 112 varies. Coil 142a may be precisely positioned by rotation of threaded plug 132a, to slightly raise or lower coil 142a relative to surface 12a, as required.

As shown by FIG. 2, fitting 26 comprises a standard compression type fitting which includes an elbow 154. An end of elbow 154 is threaded to engage threads formed around a hole 156 formed through cover 118. Tube 22 traverses fitting 26, including elbow 154, whereby an end of tube 22 is placed in communication with the air contained in chamber 112.

Fitting 26 further includes a tapered washer 158 and a nut 160, nut 160 threaded to engage elbow 154. Nut 160 is rotated relative to elbow 154 to tighten washer 158 around tube 22 and thus seal the joint between tube 22 and fitting 26. Fitting 24 comprises a compression type fitting similar to fitting 26 except that it includes a straight fitting member 162 rather than an elbow. Fitting 24 includes a tapered washer 164 and a nut 166 positioned to tightly seal the joint between tube 20 and fitting 24. Usefully, tube 20 is traversed by an inner tube 168 having an end in communication with mercury 116 through a port 170 opening into bore 114. Tube 20 is made from material such as Nylon 11 to form a protective case or jacket for tube 168. Tube 168 is made from material which is very transmissive to mercury, and the end of tube 168 is extended into bore 114. The chance that air bubbles submerged in mercury 116 will enter tube 168 is thereby substantially reduced since the air bubbles will tend to cling to the wall of bore 114.

Container 10b is identical in construction to container 10a, and is therefore not shown or described in great detail. A probe 140b is positioned in container 10b such that a coil 142b thereof is fixed at a distance D from surface 10b, the distance between coil 142b and the surface level of mercury 116 contained in the bore 114 of chamber 10b being d'. Coil 142b is coupled to components of an inductive displacement measuring system located in electronic module 14 through coaxial cable 18b, the system generating a voltage signal $V_b$ as a function of d'. The ends of tubes 22 and 168 opposite container 10a are coupled to container 10b to respectively communicate with the air and mercury contained therein. Containers 10a and 10b and tubes 22 and 168 thus form a system containing mercury and air which is closed to atmospheric pressure.

FIG. 4 shows an inductive displacement measuring system 145 having a coil 142 and an oscillator 147 coupled in parallel with coil 142. If oscillator 147 comprises a device for exciting coil 142 with a current of constant amplitude I, coil voltage will linearly vary with coil impedance Z. Coil 142, when excited, projects an electro-magnetic field into a spaced-apart conducting material, such as mercury 116, whereby eddy currents are generated in the material. The eddy currents produce a secondary field, which is reflected back to coil 142 to vary the impedance Z thereof. Variation of impedance Z is a function of the distance separating the coil 142 and the conductive material. Thus, the voltage of system 147 also varies as a function of the separating distance. In a system such as the aforesaid ELECTROMIKE DISPLACEMENT TRANSDUCER, the output signal voltage varies as a linear function of distance.

Figure 5:
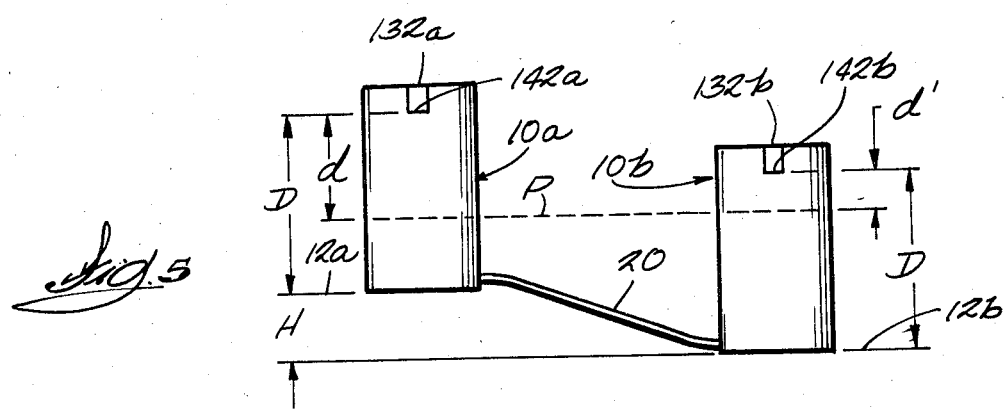
FIG. 5 is a simplified diagram for illustrating the theory of operation of the embodiment shown in FIG. 1.

To understand the theory of operation of apparatus 10 in view of the foregoing, reference may be made to FIG. 5. When containers 10a and 10b are placed upon their respective surfaces 12a and 12b, the force of gravity causes mercury to flow through tube 20, as required, to establish the mercury levels in containers 10a and 10b in the same horizontal plane P. If the surfaces 12a and 12b are separated by a height or altitude differential H and the quantities d, d' and D are as previously defined, the following relationships are valid, as illustrated by FIG. 5:

$$D - d + H = D - d'$$

or, $$H = d - d'$$

If $V_a$ and $V_b$ are linear functions of d and d', respectively, such that $V_a = f(d) = Kd + C$ and $V_b = f(d') = Kd' + C$, where K and C are constants, then:

$$d = V_a/K - C/K$$

$$d' = V_b/K - C/K$$

$$H = d - d' = 1/K(V_a - V_b)$$

Thus, the height differential between surfaces 12a and 12b is seen to be a linear function of the difference between the signals $V_a$ and $V_b$ generated by the inductive measurement systems respectively associated with chambers 10a and 10b. Electronic module 14 processes signals $V_a$ and $V_b$ to provide a voltage representing H. Such voltage drives the pointer 40 of read-out 16, and is positive or negative to indicate that one of the surfaces is higher or lower relative to the other.

As mercury flows from one of the containers to the other in response to gravitational force, the volume of the air in the container receiving mercury will decrease, whereby the air pressure therein will tend to increase. At the same time, the air pressure in the other container will tend to decrease. By providing tube 22, air pressure remains equal in the two chambers and thus has no effect on the respective levels of mercury.

Referring to FIG. 6, there is shown containers 10a and 10b schematically represented, the schematic representations including probes 140a and b, inductive coils 142a and b, bores 114 and mercury 116. Coaxial cables 18a and 18b are further shown connected to signal conversion circuits 310a and 310b, respectively, circuits 310a and 310b each including an oscillator/converter module 312. Modules 312 contain oscillators such as oscillator 147 shown in FIG. 4, and respectively generate the voltage V as function of distance d and the voltage V as a function of d'. If modules 312 comprise devices manufactured by Electro Corporation and referred to as ELECTROMIKE control oscillator converter modules, model PBA 200, the relation between voltages $V_a$ and $V_b$ and respective distances d and d' will be linear, as desired. Such modules are described in Electro Corporatiion catalog number 81AS105, marked as being copyright 1981 by the Electro Corporation. The module is also described in U.S. Pat. Nos. 4,001,218 and 4,068,189.

Circuits 310a and 310b also include potentiometers 314a and 314b which are used to calibrate the probes 140a and 140b, as hereinafter described, so that $V_a$ and $V_b$ will vary as the same linear function of distances d and d'. Each of such circuits additionally includes standard capacitors and resistors which are respectively connected and provided with the values shown therefore in FIG. 6, except that capacitors C2 are usefully 330 pico-Farads. In addition, processing circuit 310b is provided with a 1 kilohm resistor coupled between the mercury in bore 114 of container 10a and ground.

FIG. 6 further shows a circuit 318 including 15 volt nickel cadmium battery 320 coupled to the inputs of voltage regulators 322 and 324. Capacitors having the values shown in FIG. 6 are respectively connected between ground and the inputs and outputs of regulators 322 and 324. The output of voltage regulator 322 comprises a DC voltage of 12 volts and the output of regulator 324 comprises DC voltage of 6 volts. By coupling battery 320 to both regulators 322 and 324 to provide two different voltages, the need for an additional battery is eliminated. Power circuit 318 is energized or de-energized by means of a switch 326.

Referring to FIG. 7, there is shown an output circuit 328 receiving signals $V_a$ and $V_b$ through conductors 329a and 329b, respectively, and applying them to the respective inputs of a differential amplifier 330, through 20 kilohm resistors, to provide an output V which is equal to (V−V ) and thus linearly related to the quantity (d−d'). $V_d$ is coupled to a buffer amplifier 332 to provide a buffered voltage $V'_d$ which is likewise linearly related to quantity (d−d'), and which is applied to terminals 334, to which a digital volt meter may be coupled. $V_d$ is also coupled, through switch 336, to the positive input terminal of differential amplifier 338, the output of differential amplifier 338 being coupled to move pointer 40 to indicate altitude differential. The negative terminal of differential amplifier 338 is coupled to the 6 volt DC voltage provided by power supply 318, through 90 kilohm and 80 kilohm resistors. Switch 336 is moved to position 340 or 342 to increase or decrease the sensitivity of voltmeter 16 by a factor of 10. Voltage $V_d$ is coupled to amplifier 332 through a potentiometer 343, in order to scale the reading of the voltmeter 16 by the appropriate constant such that its reading deflects the actual difference in height between the chambers. This potentiometer is set only when the instrument is being callibrated.

Referring further to FIG. 7, there is shown a circuit 344 provided with a summing amplifier 346 which receives signals $V_a$ and $V_b$ and provides a signal $V_s$ representing the sum of $V_a$ and $V_b$, and therefore represents the quantity (d+d'). $V_s$ is coupled to the negative terminal of a comparator 348 and to the positive terminal of a comparator 350. The positive and negative terminals of comparators 348 and 350 are respectively coupled to reference voltages determined by resistors 352, 354 and 356. Thus, if $V_s$ exceeds a critical value, selected to indicate an excessive value of the quantity (d+d'), the output of comparator 348 will be driven to a negative value, energizing LED 58. An excessive value of (d+d') indicates that the volume of the tube 168 has become too high. Thus, it is necessary to rotate screw 172 clockwise to move a member 165 further into the bore 114 of one of the containers. The volume of such bore is thereby diminished and the mercury level in the bores 114 rises or increases. On the other hand, when $V_s$ becomes less than a critical value determined by the reference voltage coupled to comparator 350, the output of comparator 350 will energize diode 60 to indicate that thumb screw 172 should be rotated counterclockwise to increase the volume of one of the bores 114 and thus cause the mercury level in the bores to go down, or decrease.

To detect a condition of low voltage in battery 320, a circuit 358 is provided which includes a comparator 360. The 6 volt DC voltage source from power circuit 318 is coupled to the positive terminal of comparator 360 and a voltage source 362, which is the unregulated voltage of battery 320, and is coupled to the negative terminal of comparator 360, through a resistor 364. The value of resistor 364 is selected such that comparator 360 will be driven to a negative condition, and thus energize LED 62, only when the voltage output of battery 320 falls below a pre-specified value.

Referring once more to FIG. 6, there is shown mercury in bore 114 of container 10b coupled to ground through a 1 kilohm resistor, and there is further shown mercury in bore 114 of container 10a coupled to a conductor 366. If no air bubbles are contained in tube 168, an electrically conductive path is formed through conductor 368 to ground through the mercury respectively contained in containers 10a and 10b and tube 168. However, if an air bubble is present in tube 168, the conductive path therethrough, represented in FIG. 6 as conductor 367, will be broken.

In FIG. 7, conductor 366 is shown connected to the negative terminal of comparator 368 of a bubble alarm circuit 370. The negative terminal is also coupled to the 12 volt DC voltage of power circuit 318 through a resistor 372. However, the conducting path through conductor 366, tube 168 and chambers 114 to ground comprises a short circuit such that the voltage applied to the negative terminal of comparator 368 will be less than the voltage applied to the positive terminal of comparator 368, coupled to the 6 volt DC voltage source. Thus, diode 64, coupled to comparator 368, will normally be de-energized. However, if the conducting path is broken by the presence of an air bubble in tube 168, the voltage applied to the negative terminal of comparator 362 will exceed that applied to the positive terminal. and LED 64 will become energized.

It will be noted that FIG. 7 shows a number of resistors and capacitors not referred to above. Each of such elements functions in a manner which is well known to those of skill in the art, and their respective values and interconnections are shown in FIG. 7 except that each capacitor may usefully be 0.1 micro-Farad.

FIG. 8, shows a fixture 410 for calibrating the circuits 310a and 310b so that $V_a$ and $V_b$ will vary as the same linear function of their associated distances d and d'. Fixture 410 comprises cylindrical members 412, 414 and 416 which are tightly held together in coaxial relationship by means of brass studs 418, member 414 being positioned between members 412 and 416. The ends of studs 418 are threaded to engage nuts 420. Bore 424 is filled with mercury 426, retained therein by means of a 0.05 inch plastic shim 428 positioned at one end of bore 424, and a 0.005 inch plastic shim 430 positioned at the other end thereof. The joints between member 414 and members 412 and 416 are tightly sealed by means of O-rings 432 positioned therebetween.

Each bore 422 is sized to successively receive threaded probe 140a and 140b, such that the coils 142a and 142b thereof are successively brought into abutting relationship with one of the shims 428 or 430. Each coil is thus spaced at precisely the same distance from the mercury contained in bore 424. Potentiometers 314a and b of circuits 310a and b are adjusted so that $V_a$ and $V_b$ will be the same for the same spacing of coils 142a and 142b from the mercury. Thus, over the range of operation of leveling apparatus 10, the functional relationships between $V_a$ and distance d and between $V_b$ and distance d' will be the same.

FIG. 9 shows a modified chamber support which comprises a circular plate 510. Plate 510 is attachable to the underside of each container by means of plastic screws 512, and V-shaped pockets 514 are formed in plate 510 for precisely mating with ball feet 150. A flat bottom pocket 516 is machined in plate 510 so that plate 510 is supported upon a surface by a narrow annular shoulder 518.

FIG. 10 shows plate 510 provided with holes 520, which are sized to receive screws 512 so that plate 510 can be attached to an associated chamber 10a or 10b.

I claim:

1. Leveling apparatus (10) for measuring the vertical difference between first (12a) and second (12b) horizontal surfaces, said leveling apparatus of the type having a first chamber (10a) located on the first surface (12a); a second chamber (10b) located on the second surface (12b); means (132a) for establishing a first reference level relative to the first surface and a second reference level relative to the second surface; electrically conductive fluid (116) in the first and second chambers (10a, 10b), the level of fluid in the first chamber being spaced vertically from the first reference level by a first distance and the level of fluid in the second chamber being spaced vertically from the second reference level by a second distance; means (20) connecting the fluid in the first chamber (10a) to the fluid in the second chamber (10b) to establish the fluid levels in the two chambers in the same horizontal plane; and means (14, 140a, 140b) for sensing the difference between the first and second distances, said sensing means comprising:

a first means (142a, 310a,) for establishing a first electro-magnetic field in said first chamber (10a) and sensing said first electro-magnetic field at said first reference level to provide a first electrical signal that is a function of said first distance;

a second means (142b, 310b) for establishing a second electro magnetic field in said second chamber (10b) and sensing said second electro-magnetic field at said second reference level to provide a second electrical signal that is a function of said second distance; and means for processing said first and second electrical signals to provide a third electrical signal varying as a function of the difference between said first and second distances and representing the vertical difference between said first and second surfaces.

2. The apparatus of claim 1 wherein:
said electrically conductive fluid (116) comprises a liquid.

3. The apparatus of claim 2 wherein:
said apparatus includes means for hermetically sealing the first (10a) and second (10b) chambers and for connecting a first volume above the fluid in the first chamber (10a) to a second volume above the fluid in the second chamber (10b); and
said means (24) connecting fluid in the first chamber (10a) with fluid in the second chamber (10b) comprises a conduit (20) connected between the first (10a) and second (10b) chambers.

4. The apparatus of claim 1 wherein:
said means for establishing said first electro-magnetic field includes a first inductive element (142a) and means (140a) for mounting said first inductive element (142a) in said first volume and at said first reference level; and
said means for establishing said second electro-magnetic field comprises a second inductive element (142b) and means (140b) for mounting said second inductive element (142b) in said second volume and at said second reference level.

5. The apparatus of claim 4 wherein:
said first and second reference levels are located at the same height above said first and second surfaces, respectively.

6. Apparatus for measuring the vertical difference between first and second generally horizontal surface portions comprising:
a pool of electrically conductive fluid having a first pool portion on said first surface portion and a second pool portion on said second surface portion;
means for establishing a first inductive field adajacent to said first pool portion and a second inductive field adjacent to said second pool portion;
means for sensing said first inductive field at a position located a first distance from the surface level of said first pool portion and generating a first signal representing said first distance;
means for sensing said second inductive field at a position located a second distance from the surface level of said second pool portion and generating a second signal representing said second distance; and
means for processing said first and second signals to provide a third signal representing the difference between said first and second distances and the vertical distance between said first and second surface portions.

7. The apparatus of claim 6 wherein:
said first pool portion comprises a quantity of electrically conductive fluid contained in a chamber formed within a first container located upon said first surface portion and said second pool portion comprises a quantity of electrically conductive fluid contained in a second chamber formed within a second container located upon said second surface portion, the fluid in the first and second chambers being connected through a conduit to establish the surface levels in the two chambers in the same horizontal plane.

8. The apparatus of claim 7 wherein:
said apparatus includes means for generating an alarm in response to the presence of air bubbles in said conduit.

9. The apparatus of claim 7 including:
means for determining the sum of said first and second distances and providing notice when said sum has a value lying outside a pre-specified range; and
means for enabling an operator to controllably vary the volume of the chamber of one of said containers to bring said sum into said pre-specified range in response to said notice.

10. The apparatus of claim 7 wherein:
said means for generating said first signal comprises a first inductive displacement measuring system having a first inductive element at said first position located a first distance from the surface level of said first pool portion; and
said means for generating said second signal comprises a second inductive displacement measuring system having a second inductive element located at said position located a second distance from the surface level of said second pool portion.

11. The apparatus of claim 10 including:
means for positioning said first inductive element at a first selected distance from said first surface portion; and
means for positioning said second inductive element at a second selected distance from said second surface portion.

12. The apparatus of claim 11 wherein:
said first selected distance is equal to said second selected distance.

13. The apparatus of claim 10 wherein:
said electrically conductive fluid comprises mercury.

14. A method for measuring the vertical difference between first and second generally horizontal surface portions comprising the steps of:
placing a first quantity of electrically conductive fluid on said first surface portion and a second quantity of said electrically conductive fluid on said second surface portion;
providing a fluid transmissive path between said first and second quantities for enabling gravitational force to cause fluid to flow from one of said quantities to the other until the surface levels of said first and second quantities lie in the same horizontal plane;
projecting a first primary electro-magnetic field into said first fluid quantity to generate a first secondary electro-magnetic field;
sensing said first secondary electro-magnetic field at a position located a first unknown vertical distance from said horizontal plane and a first known vertical distance from said first surface portion;
generating a first electrical signal representing said sensed first secondary electro-magnetic field and also representing said first unknown vertical distance;
projecting a second primary electro-magnetic field into said second fluid quantity to generate a second secondary electro-magnetic field;
sensing said second secondary electro-magnetic field at a position located a second unknown vertical distance from said horizontal plane and a second known vertical distance from said second surface portion;

generating a second electrical signal representing said sensed second secondary electro-magnetic field and also representing said second unknown vertical distance; and generating a third electrical signal representing the difference between said first and second electrical signals and thereby representing the difference between said first and second unknown vertical distances, said difference between said unknown first and second vertical distances being equal to the vertical distance between said first and second surface portions.

15. The method of claim 14 wherein:

said step of projecting said first primary electro-magnetic field comprises the steps of positioning a first inductive coil above the surface level of said first fluid quantity and at said first known vertical distance above said first surface portion, and activating said first inductive coil; and said step of projecting said second primary electro-magnetic field comprises the steps of positioning a second inductive coil above the surface level of said second fluid quantity and at said second known vertical distance above said second surface portion, and activating said second inductive coil.

16. The method of claim 15 wherein:

said step of sensing said first secondary electro-magnetic field comprises sensing the inductance of said first inductive coil in response to said first secondary electro-magnetic field; and said step of sensing said second secondary electro-magnetic field comprises sensing the inductance of said second inductive coil in response to said second secondary electro-magnetic field.

17. The method claim 16 wherein:

said first known vertical distance is equal to said second known vertical distance.

18. The method of claim 17 wherein:

said fluid comprises mercury.

* * * * *